B. F. MILLER.
BALING-PRESS.

No. 193,265.

2 Sheets—Sheet 1.

Patented July 17, 1877.

Attest.
Walter Knight
Herbert Knight

B. F. Miller
By Knight Bros.
Attys.

N. PETERS, PHOTO-LITHOGRAPHER, WASHINGTON, D. C.

2 Sheets—Sheet 2.

B. F. MILLER.
BALING-PRESS.

No. 193,265.  Patented July 17, 1877.

Attest
Walter Knight
Herbert Knight

B. F. Miller
By Knight Bros
Attys.

UNITED STATES PATENT OFFICE.

BENJAMIN F. MILLER, OF OWENSBOROUGH, KENTUCKY.

IMPROVEMENT IN BALING-PRESSES.

Specification forming part of Letters Patent No. 193,265, dated July 17, 1877; application filed May 7, 1877.

*To all whom it may concern:*

Figure 1:
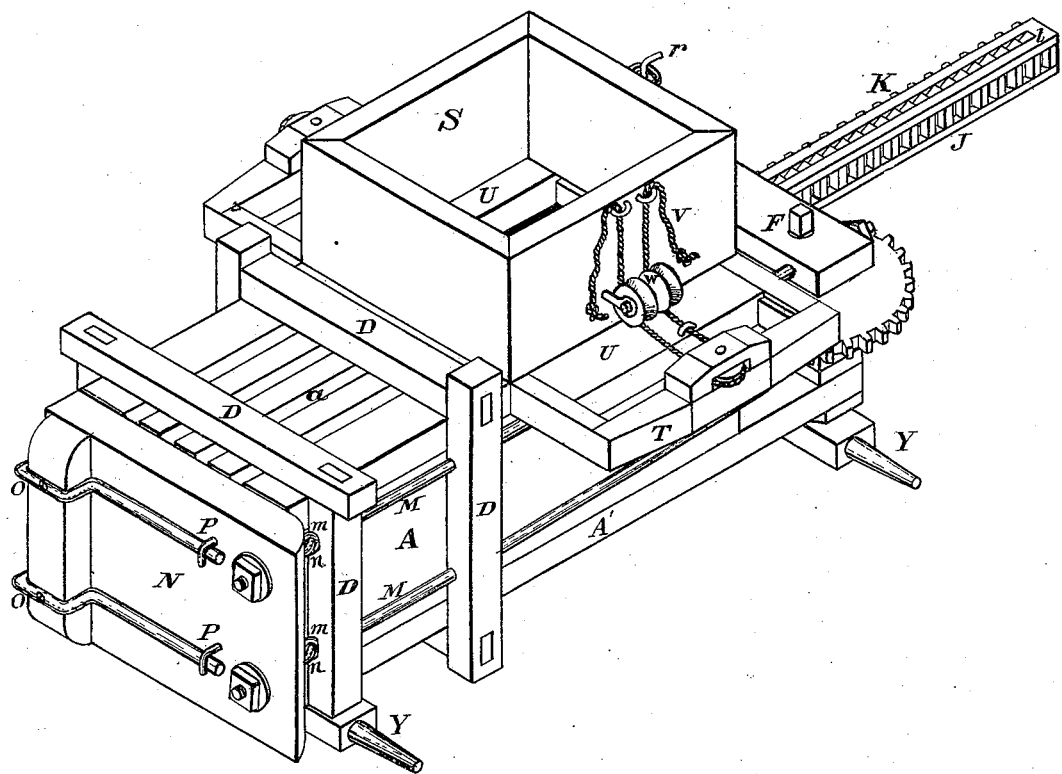
Figure 2:
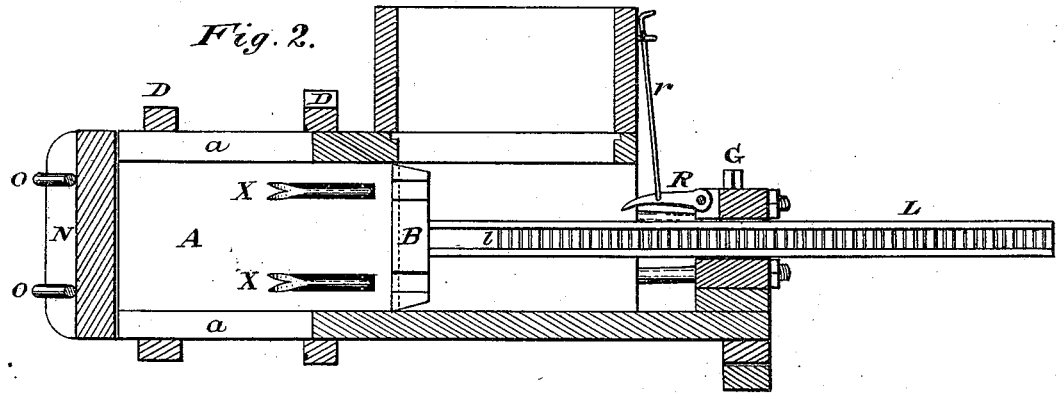
Figure 3:
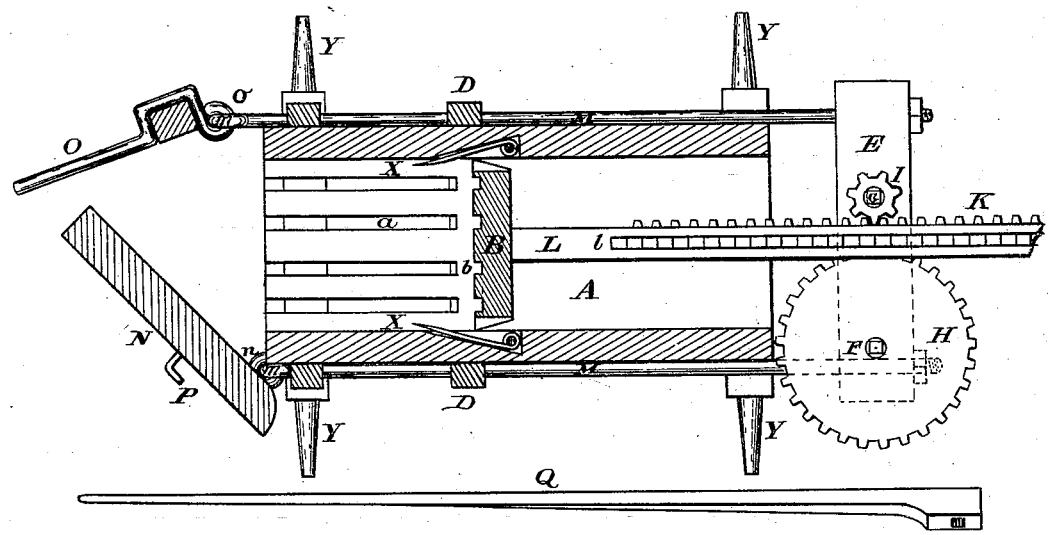
Figure 4:
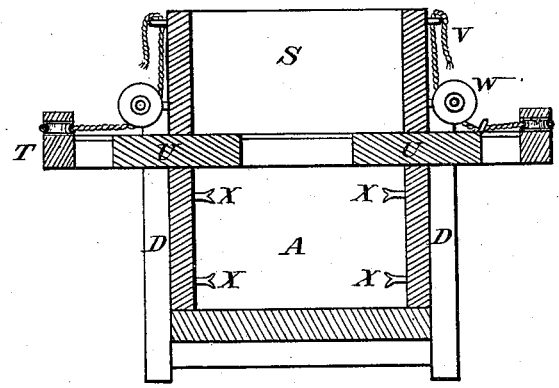

Be it known that I, BENJAMIN F. MILLER, of Owensborough, Daviess county, Kentucky, have invented a new and useful Baling-Press, of which the following is a specification:

In the accompanying drawings, Figure 1 is a perspective view of a press embodying my improvement, the discharge-door being represented closed. Fig. 2 is a vertical longitudinal section. Fig. 3 is a horizontal section through the hay-box. Fig. 4 is a transverse vertical section through the feed and hay boxes, looking toward the delivery end.

A represents a wooden trunk or tube, of rectangular cross-section, corresponding with the desired length and width of the bale. This tube constitutes the box, within which the follower or plunger B works for compressing the hay or other commodity to be baled. This tube is designated the hay-box.

That end of the box A, in which the bale receives its final compression, is slotted as at a, to receive and pass the bale bands or hoops, and securely bound by stout framings D.

The bottom sills A' of the box A are prolonged rearward, and support housing E, within which are journaled the vertical shafts F and G of two cog-wheels, H and I, of unequal diameter, and which gear, respectively, in two racks, J and K, upon the stem L of the plunger.

Bolts M, which traverse this housing, terminate in front in eyes m for the engagement of staples n from door N, and the looped extremities o of latch-rods O. Hooks or buttons P on the door N serve to secure and hold fast the rods O, and thus lock the door N.

The upper ends of the shafts F and G are of square or other suitable form, for the engagement of the sweep or lever Q.

Ratchet-notches l, in the top side of stem L, receive a gravitating-pawl, R, which serves to hold the follower or plunger B to the position to which it has been advanced. A rod or cord, r, secured to the pawl R, enables it to be liberated at any instant.

The receiving-end of the hay-box is open on its upper side, where it communicates with a feed-box, S, through a frame, T, which holds and guides a pair of sliding shutters, U, that are capable of being either closed over the opening of the box A or of being withdrawn therefrom. This closure and withdrawal may be facilitated by a cord, V, passing around suitable sheaves W, and attached to the shutter.

Hinged to the inner vertical walls of the box A are forks X, which, on each retreat of the follower, engage automatically in the body of hay, and thereby prevent any retrograde movement thereof. These forks are so constructed and attached as in nowise to oppose the motion of the follower.

Y are axles for attachment of ground-wheels.

The operation is as follows: The door N being closed and securely latched, and the follower B being drawn back to its starting position, loose hay (or other material to be baled) is fed in through the feed-box and tramped down. The box A having thus become packed with loose hay, the operator applies the lever Q to the shaft F of the larger cog-wheel H, and, by rotating said wheel, advances the follower B as far as practicable. The follower is then retracted by a reverse movement of the lever Q, and a fresh charge of hay tramped in, and so on, as often as may be necessary. When as much hay has been packed in front of the follower B as is practicable by this means, the pawl R is dropped, and the lever Q is applied to the shaft G of the smaller cog-wheel I, which is of so much less diameter than the wheel H as to exert many fold greater power—about fivefold in the present illustration. This enables the hay to be compressed into the desired dimensions when it is bound in the usual way. Instead, however, of at once removing the bound bale from the press, the operator merely opens the door N, and allows the bound bale to remain in place as an abutment for the succeeding batch of hay, which, as it becomes compressed by the action of the follower, gradually forces the bound bale forward until it expels it from the press, which having taken place, the door N is closed, as before, and the bale is completed in the manner above indicated.

I claim as new and of my invention—

1. The combination, with a baling-box, A, and end delivery N, of the follower B, whose stem has three series of racks, J, K, and $l$, for the engagement of the two wheels H and I of unequal diameters, and the tentative-pawl R, as represented.

2. The combination of feed-box S, bale-box A, and the sliding shutters U U, operated by the cords V, and sheaves W, in the manner stated.

In testimony of which invention I hereunto set my hand.

BEN. F. MILLER.

Attest:
 JNO. H. KNIGHT.
 R. L. ELLIS.